Sept. 19, 1933.   L. P. HAMILTON   1,927,740
SWAB
Filed July 25, 1932
Fig. 1.
Fig. 3.
Fig. 2.
Fig. 4.
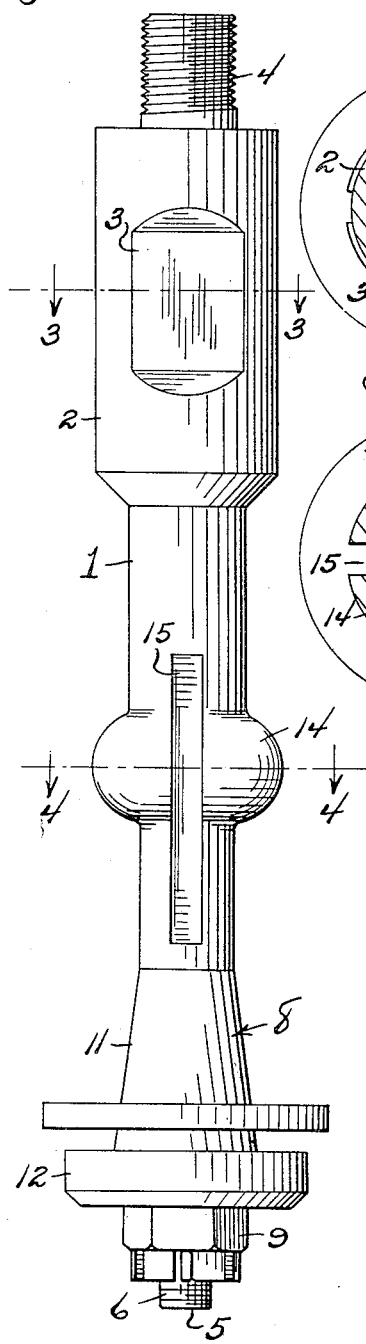
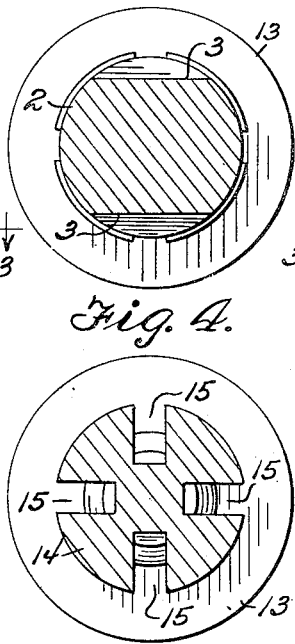
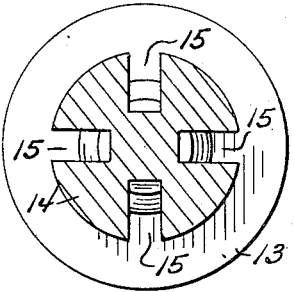
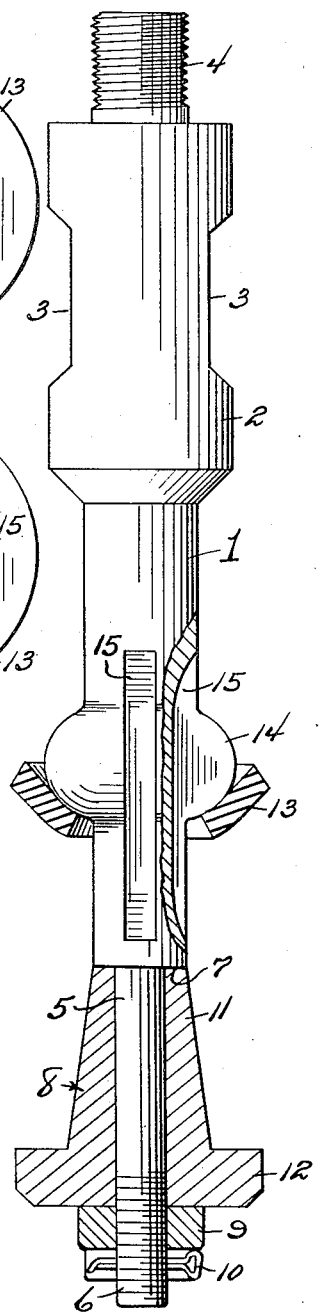
Linzie P. Hamilton
INVENTOR
BY Victor J. Evans & Co.
ATTORNEY Patented Sept. 19, 1933

1,927,740

UNITED STATES PATENT OFFICE 1,927,740

SWAB

Linzie P. Hamilton, Garrison, Pa., assignor of one-half to John H. Hamilton, Garrison, Pa.

Application July 25, 1932. Serial No. 624,524

1 Claim. (Cl. 103—225)

This invention relates to swabs especially adapted for removing oil and water from gas wells and has for the primary object, the provision of a device of the above stated character which may be easily and quickly actuated within a well and which will be simple and durable in construction and which may be manufactured and sold at a low cost.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a swab constructed in accordance with my invention.

Figure 2 is a vertical sectional view illustrating the same.

Figure 3 is a sectional view taken on the line 3—3 of Figure 1.

Figure 4 is a sectional view taken on the line 4—4 of Figure 1.

Referring in detail to the drawing, the numeral 1 indicates an elongated body, a portion of which is enlarged as shown at 2 and provided with oppositely disposed flat faces 3 to be engaged by a wrench to facilitate the attaching and detaching of the swab to a conventional type of operating mechanism. The enlarged portion 2 has formed thereon a reduced screw threaded shank 4 adapted to have threaded connection with the operating means. The lower end of the body 1 is reduced to form a stem 5 screw threaded as shown at 6 and forming between itself and the body an annular shoulder 7. A seat 8 is mounted on the stem 5 and retained in abutting engagement with the shoulder 7 by a nut 9 threaded to the stem and secured against accidental displacement by a cotter key 10. The seat 8 consists of a conical shaped portion 11 terminating in its lower end into an annular portion 12 adapted to form a rest or stop for a washer 13. The body 1 substantially intermediate its ends is formed with an enlargement 14 of substantially spherical shape intersected by a plurality of vertically disposed grooves 15. The enlargement 14 is adapted to limit the upward movement of the washer 15 upon the body as shown in Figure 2 and due to the particular shape of the enlargement, the washer may assume a substantially cup shape for the purpose of permitting the body 1 to move freely downwardly within a well, it being understood that the washer engages the walls of the well and the grooves 15 permit the oil and water within the well to readily pass the washer during said downward movement of the body within the well. On the upward movement of the body within the well, the washer assumes a position as shown in Figure 1 acting as a check or closure against the water or oil passing the body during its upward movement, consequently permitting all oil and water trapped above the washer 13 to be raised and thereby removed from the well.

While I have shown and described the preferred embodiment of my invention, it will be understood that minor changes in construction, combination and arrangement of parts may be made without departing from the spirit and scope of my invention, as claimed.

Having thus described my invention, what I claim is:

A swab comprising an elongated body having a portion thereof reduced to form an annular shoulder and an extension, a seat removably mounted on the extension and abutting the shoulder and including integral conical and annular portions, said annular portion projecting beyond the conical portion to form a stop flange, a spherical portion formed on the body and provided with grooves extending into said body, and a flexible washer slidable on the body and conical portion and movable between the stop flange and the spherical portion and when in engagement with the latter and the walls of a well adapted to assume cup shape during the movement of the body in one direction.

LINZIE P. HAMILTON.